Jan. 19, 1932. T. J. McNULTY 1,841,493
OIL PRESSURE CONTROL AND FILTER FOR HYDRAULIC PRESSES
Filed Jan. 25, 1930
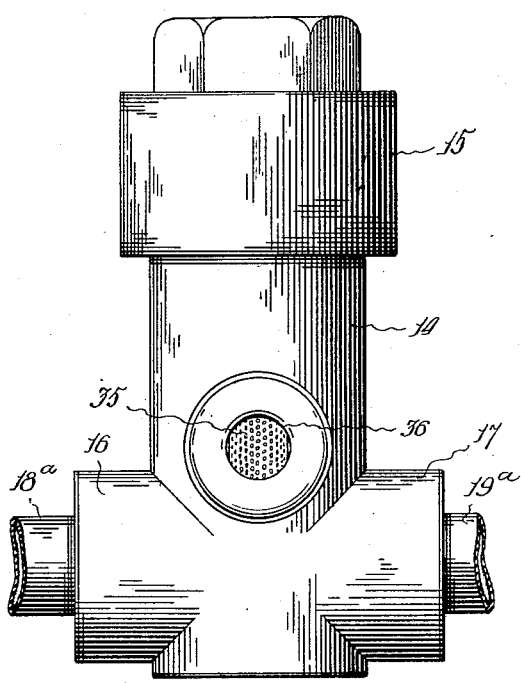
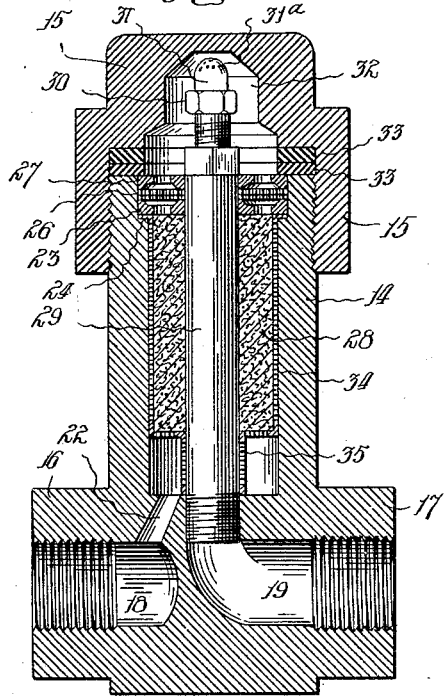
Inventor
Thomas J. McNulty.
By
Attorney Patented Jan. 19, 1932

1,841,493

UNITED STATES PATENT OFFICE

THOMAS J. McNULTY, OF BROOKHAVEN, MISSISSIPPI

OIL PRESSURE CONTROL AND FILTER FOR HYDRAULIC PRESSES

Application filed January 25, 1930. Serial No. 423,461.

My invention relates to improvements in hydraulic presses used in oil mills in the operation of forming the cake as well as extracting the oil from the cake, and relates more especially to means for controlling the oil pressure to the ram, the present invention being an improvement in the combined oil filter and pressure control device set forth in my application for patent filed June 1, 1929, Serial No. 367,819.

The modern practice in oil mills is to operate the ram under a low pressure of oil up to a predetermined point and then continue the operation under a high pressure of the oil, for which purpose it is customary to employ automatic change valves by which to regulate the pressure in the formation of the cake and expressing the oil therefrom, but I have found by practical experience there is no need of using two different pressures in the line to the press as a constant flow up to 500 pounds will give the desired result in the extraction of the oil and afford a saving in press cloth.

My improved device employed in connection with hydraulic presses using oil as the fluid pressure is for the purpose of more effectively filtering the oil so that it will maintain its fluency and includes means for controlling the flow of the oil to the press or presses so as to dispense with the employment of the usual automatic change valves by transmitting the desired pressure to the ram thus increasing its efficiency as well as preserving the life of the press cloth, in the present instance an improved construction of the filter and a modification of the nipple which controls the flow of the filtered oil to the presses being such as to increase the effectiveness of the device over the arrangement shown and described in my aforesaid application.

The improvements therefore relate more especially to the form of basket containing the filtering material through which the oil passes, and a modification of the nipple which controls the feeding of the oil under pressure to the pipe line leading to the presses, and what I desire to now protect by Letters Patent is more specifically set forth in the appended claim.

In the drawings forming a part hereof:

Figure 1 is a side elevation of an oil filtering and control device in accordance with my invention.

Fig. 2 is a vertical transverse sectional view through the device, showing the form of casing in which the inlet and outlet openings are on a line with each other.

Fig. 3 is a side elevation, partly in section, showing a modified form of casing in which the inlet and outlet openings are on different horizontal planes.

Fig. 4 is a detail side elevation of the improved form of basket containing the filtering material.

Figs. 5 and 6 are side and sectional views of the nipple.

My invention is especially adapted for use in connection with oil mills in which a hydraulic motor employing oil as the fluid pressure is used with a pump driven by motive power such as a steam engine, the combined filter and pressure control device being incorporated in the pipe line from the pump to the ram so as to control the pressure to the ram by purifying the oil before it passes to the reducing nipple.

In carying out my invention the casing which contains the filter and means for controlling the oil presure comprises a body portion 14 and removable cap 15, the body portion of the casing illustrated in Figs. 1 and 2 having integral coupling members 16 and 17 at opposite sides of the lower end thereof into which pipes 18a and 19a leading to and from the casing are threaded, and within said body portion is a filtering chamber 20 through the bottom of which extend openings 21 and 22 communicating with the inlet and outlet openings 18 and 19 respectively with which the aforementioned pipes 18a and 19a are connected, the opening 21 at the bottom of the chamber being located centrally and threaded to receive the pressure control device hereinafter described. The upper part of the filtering chamber is enlarged to receive a perforated disk 23 resting on a shoulder 24 formed by enlarging the upper end of said chamber, and upon this disk is placed an annular screen 26 held in place by a second perforated disk 27 the upper surface of which is approximately flush with the upper end of the body portion of the casing 14, said disks 23 and 27 being each provided with an annular groove 23a at the inner side thereof or contiguous to the screen. The oil entering the lower end of the filtering chamber passes upward therein to the disks and screen through filtering material 28, and extending upward through the center of this filtering material, disks and screen is a tube 29 threaded at its lower end in the opening 21 at the bottom of the chamber and at its upper end is provided with a nipple 30 having in this instance a plurality of small orifices or inlet openings 31a, the nipple being preferably detachable for which purpose it is threaded into the upper end of the tube so that it may be readily removed for substitution of a new nipple in which the orifices are of a larger or smaller size than the one removed or for replacing a nipple should it become worn from use. The nipple on the upper end of the tube 29 extending through the filtering material projects above the upper disk 27 into a cavity 32 in the cap 15, said cavity forming a reservoir for the oil with the upper or inner end thereof tapered and the perforated end of the nipple located a suitable distance from the apex, and for the purpose of providing a tight joint between the cap and upper end of the body portion of the device suitable gaskets 33—33 are interposed as shown in the drawings.

The filtering material 28 is confined around the tube 29 by a basket 34, and instead of having said basket extend all the way to the bottom of the chamber 20 as shown in my prior application for patent it is in this instance shaped to provide a body portion with a reduced downward extension 35 at the center through which the tube 29 passes, whereby the annular bottom of the body portion is disposed above the bottom of the chamber 20 in the casing to form a space for receiving the oil from which it passes through the perforated annular bottom into the filtering material. By means of this improved form of basket which provides a space in the lower end of the chamber to receive the oil from the inlet 22 a greater area is presented at the bottom of the basket for the passage of the oil into the filtering material than by having the filtering material extend to the bottom of the chamber in the casing, resulting in more effectively filtering the oil. The filtering material is preferably press cloth darning yarn, though of course any other material may be used and the screen which is interposed between the disks 23 and 27 is provided with apertures which are smaller than the perforations through said disks to strain the oil of any foreign matter that may pass through the filtering material and thus prevent choking of the orifices in the nipple.

It will be understood that filtering and control devices in accordance with my invention are located in both lines leading to and from the hydraulic motor and ram and that the improved form of basket as well as the nipple having a plurality of orifices is applicable not only to the form of valve casing shown in Figs. 1 and 2 of the drawings but also to that form shown in Fig. 3 in which coupling 37 having the threaded inlet opening 18b is on a line with the lower end of the filtering chamber 20 while the coupling 39 having the outlet opening 19b is below the lower end of the tube 29; but in each instance the front of the casing is provided with a clean-out opening 36 leading into the space below the annular bottom of the basket, as does the inlet opening 18b.

The operation of my improved means for controlling the fluid pressure of the oil to and from the ram will be understood from the foregoing description, for the oil entering the device through the inlet 22 (Fig. 2) or 18b (Fig. 3) circulates around the space in the lower end of the chamber and passes through the annular bottom of the basket into and through the filtering material on through the perforated disks 23—27 and interposed screen 26 to be purified of any foreign substances—as foots, or grit from the packings of the pump—and will flow freely through the reducing orifices in the nipple 30 to the tube 29 and on to the ram or to the pump, as the case may be, through outlet 19 (Fig. 2) or 19b (Fig. 3), the size of the orifices in the nipple of the filtering and control device governing the pressure of the oil on the ram and preventing any danger of it flowing so fast as to cause the pump to run away. As will be obvious the filtering of the oil will eliminate the possibility of the orifices becoming choked, and consequently as there will be a steady flow of the oil the presses will travel the full height at all times resulting in a better extraction from the oil bearing meats or cake, thus increasing the output of the oil from the same.

The filtering material in the chamber of the casing can be cleaned or flushed out by removing the cap and blowing out through the clean-out opening having the usual valved nipple, or the filtering material may be renewed by simply removing the basket and replacing it with another one having a supply of packing.

The improvements or modifications forming the subject matter of this application provide for a more effective operation of the combined oil filter and control for hydraulic presses, and it will be understood that further modifications or changes may be made within the spirit and scope of my claim.

I claim:

In combination with a device for controlling the flow of oil to a hydraulic ram comprising a casing having a chamber for the filtering material and an outlet tube for controlling the passage of oil from the device, the oil entering the chamber at the lower end thereof and passing into the tube at the upper end of said chamber, of a cylindrical basket of foraminous material having a central depending portion through which the tube passes, the body portion of said basket containing the filtering material, and a nipple for the upper end of the tube having a plurality of orifices through which the oil passes into said tube.

T. J. McNULTY.